United States Patent
Reed et al.

(10) Patent No.: US 6,189,015 B1
(45) Date of Patent: Feb. 13, 2001

(54) SYSTEM AND METHOD FOR UPDATING NON-VSAM DATA SET CONTROL INFORMATION FOR DATA TRANSFERRED FROM A SOURCE TO A TARGET

(75) Inventors: David Charles Reed; John Glenn Thompson, both of Tucson, AZ (US)

(73) Assignee: International Business Machines Corporation, Armonk, NY (US)

( * ) Notice: Under 35 U.S.C. 154(b), the term of this patent shall be extended for 0 days.

(21) Appl. No.: 09/160,743

(22) Filed: Sep. 25, 1998

(51) Int. Cl.⁷ ..................................................... G06F 17/30
(52) U.S. Cl. ......................... 707/201; 707/100; 711/101; 711/202
(58) Field of Search .................................... 707/100, 101, 707/102, 202, 200, 201, 203, 204, 208; 711/100, 101, 111, 112

(56) References Cited

U.S. PATENT DOCUMENTS

| | | | |
|---|---|---|---|
| 4,408,273 | 10/1983 | Plow | 364/200 |
| 4,580,211 | 4/1986 | Doki et al. | 364/200 |
| 4,633,387 * | 12/1986 | Hartung et al. | 709/105 |
| 4,939,598 | 7/1990 | Kulokowski et al. | 360/48 |
| 4,974,197 | 11/1990 | Blount et al. | 364/900 |
| 5,283,884 * | 2/1994 | Menon et al. | 711/113 |
| 5,403,639 * | 4/1995 | Belsan et al. | 707/204 |
| 5,625,817 * | 4/1997 | Wood et al. | 707/101 |
| 5,644,696 * | 7/1997 | Pearson et al. | 714/6 |
| 5,694,570 * | 12/1997 | Beardsley et al. | 711/113 |
| 5,794,255 * | 8/1998 | Hayashi et al. | 707/205 |
| 5,983,317 * | 11/1999 | Kanda et al. | 711/112 |
| 6,078,932 * | 6/2000 | Haye et al. | 707/204 |

* cited by examiner

Primary Examiner—Hosain T. Alam
Assistant Examiner—Anh Ly
(74) Attorney, Agent, or Firm—Dan Hubert & Assoc.

(57) ABSTRACT

A system and method for maintaining non-VSAM data set control information when moving a non-VSAM data set from a source volume to a target volume, even if the data set is not read into a host. After data is moved from the source volume set to the target volume set, each target volume is analyzed to determine the last track and record used by the data set and this information is recorded the in each target volume virtual table of contents (VTOC). In one embodiment where the volume geometry is identical, the last track and record are determined by examining the last target volume not completely filled with data from the data set. In this last target volume, accessing the VTOC of the last source volume containing data for the data set to obtain the R value for the DS1LSTAR of the last source volume and determining a TTR value for the data set on the first target volume having a TT value equal to the total number of tracks occupied by the data set and an R value equal to the R value of the last source volume and recording in the VTOC of the last target volume the TTR value for the DS1LSTAR of the last target volume.

21 Claims, 2 Drawing Sheets

SYSTEM AND METHOD FOR UPDATING NON-VSAM DATA SET CONTROL INFORMATION FOR DATA TRANSFERRED FROM A SOURCE TO A TARGET

FIELD OF THE INVENTION

The present invention pertains to the field of data storage. More particularly, this invention pertains to a method and apparatus for updating the control information of a non-VSAM data set for data that is not read into the host during transfer.

BACKGROUND OF THE INVENTION

One of the key components of a computer system is a place to store data. Typically computer systems employ a number of storage means, including "volumes" which can be disk drives (also called a direct access storage device or DASD), that are used to store data. Physical volume storage systems typically employ some number of physical volumes that each contains multiple tracks on which to store data.

An alternative to a physical volume storage system is a virtual volume storage system. A virtual storage system, such as a log-structure array system, typically contains a number of "virtual volumes," each having a "virtual track table" with pointers to "virtual tracks" on the virtual volume. The description of a virtual storage system is contained in IBM publication "IBM RAMAC Virtual Array" document no. SG24-4951-00 (IBM Copyright, 1997) which is incorporated herein by reference.

Both VSAM and non-VSAM data sets can be stored in a data storage system. Non-VSAM data sets differ from VSAM data sets in their organization and control information. The present invention is directed to maintenance of control information during data movement of non-VSAM data sets.

Data movement involves the copying and/or moving of a data set from one volume or set of volumes to another volume or set of volumes within a storage system. As the data set is copied or moved, the layout of the volumes within that storage system changes. However, even after a movement of the data set, the control information for the target data set that has been copied or moved must be maintained.

Unlike a physical volume environment, in a virtual volume environment the data set is not read into a host when the data set is moved. Within a virtual volume storage system, it becomes very difficult to maintain the control information when moving non-VSAM data sets that are not read into the host. Therefore, it becomes very difficult, or impossible, to determine the amount of data that actually resides on each volume after movement of non-VSAM data sets that are not read into a host computer.

SUMMARY OF THE INVENTION

The present invention provides an improved data set control information tracking system and method that substantially eliminates or reduces disadvantages and problems associated with previously developed systems and methods used for maintenance of non-VSAM data set control information.

More specifically, the present invention provides a system and method for maintaining non-VSAM data set control information when moving a data set from a source volume to a target volume. From the control information on the source volume(s), the total space or number of tracks required to store the data set is determined and at least that amount of space is allocated on the target volume(s). The data set is moved to the target volume without reading the data into a host computer. A data movement program will compare the space allotted for the data set in each target volume to the total size of the data set to determine if the data set filled each target volume. In one embodiment, to determine the control information for the last target volume with data from the data set, the data movement program will subtract from the total number of tracks of data in the data set the number of tracks of data stored in previous target volumes to determine the number of tracks on the last target volume. The data movement program will combine this number of tracks with the number of records on the last track of the source volume to give the control information for the data set on the last target volume.

The present invention provides an important technical advantage by maintaining non-VSAM data set control information after movement of the data set from a source to a target volume.

The present invention provides another technical advantage by allowing the determination of the beginning and ending points on a target volume of a non-VSAM data set after movement from a source volume.

The present invention provides yet another technical advantage by maintaining control information for a non-VSAM data set after movement in both physical and virtual storage system environments.

BRIEF DESCRIPTION OF THE DRAWING

For a more complete understanding of the present invention and the advantages thereof, reference is now made to the following description taken in conjunction with the accompanying drawings in which like reference numerals indicate like features and wherein.

DETAILED DESCRIPTION OF THE PREFERRED EMBODIMENT

Figure 1:
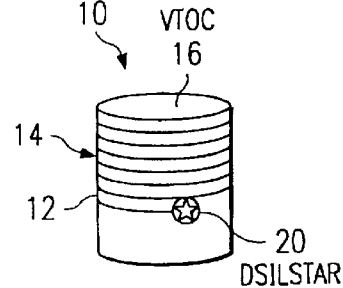
FIG. 1 shows generally the storage of a non-VSAM data set on a volume for both physical and virtual storage volumes storing.
Figure 2:
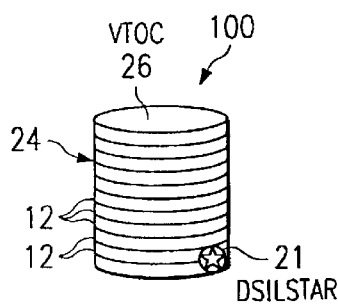
FIG. 2 shows generally the movement of a non-VSAM data set from multiple volumes to a single volume for both physical and virtual storage volumes.
Figure 2:
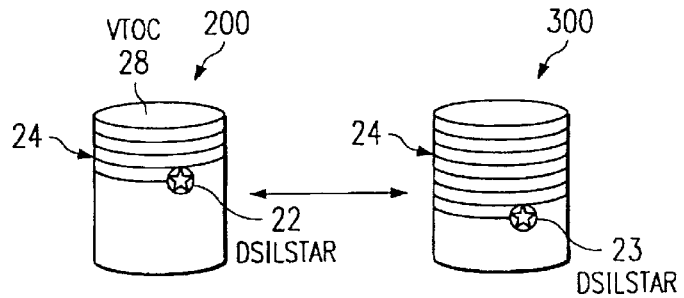

Both physical and virtual volumes initially comprise a number of empty tracks on which data can be stored. FIGS. 1 and 2 indicate general storage of data on volumes for both physical and virtual storage volumes storing non-VSAM data sets. FIG. 1 shows a volume 10 that contains a number of tracks 12 for storing data. The space occupied on a volume by a single set of data is referred to as a data set. A number of data sets can typically be stored on any volume. FIG. 1 includes data set 14 that occupies a number of tracks 12. In order to track where each data set resides on the volume, a set of control information is maintained on the volume table of contents (VTOC) 16. The VTOC 16 will contain an entry of control information for each data set 14 contained on that volume 10. One field within the VTOC 16 control information is the DS1LSTAR 20 for each non-VSAM data set 14. The DS1LSTAR 20 provides a high use water mark that shows where the data set 14 ends within the volume 10.

When a data set is created, a certain number of tracks are set aside within the volume 10 for that data set. For example, if 100 tracks have been set aside for storing a data set, when data is stored on that 100 tracks, the DS1LSTAR is a piece of information on how much of the 100 tracks have been used to date. The DS1LSTAR will mark the last used track and record for the data set. Each non-VSAM data set on the volume will have a DS1LSTAR such that the VTOC contains a DS1LSTAR for data set number 1, data set number 2, and so on for each data set on the volume. As data is added to the data set, the DS1LSTAR changes to mark the new location of the last used track and record to indicate where the data ends within the volume. The DS1LSTAR is a relative track number and record indicator that indicates the number of tracks used to store the data set and the last record used on the last track. The DS1LSTAR has a three byte track, track, record (or "TTR") format where the first two "TT" bytes indicates the relative track information and the third byte "R" is the last record used on the last track used. Thus, the DS1LSTAR not only keeps track of the relative tracks used for a data set, but also the last record used on the last relative track.

FIG. 2 shows a multi-volume data set 24 that is stored across multiple volumes. Volume 100 has VTOC 26 and volume 200 has VTOC 28 that each includes DS1LSTAR information for the data set 24. VTOC 26 will maintain the control information for the portion of data set 24 that resides on volume 100, while VTOC 28 will maintain the control information for the portion of data set 24 that resides on volume 200. As shown in FIG. 2, the allocated space on volume 100 for data set 24 is full with data from data set 24. As a result, the last track and record of data for data set 24 actually resides on volume 200 at DS1LSTAR 22. Thus, as data is added to data set 24, the DS1LSTAR 22 on volume 200, the last volume in the volume set, will be updated to indicate the last track and record used by data set 24, while DS1LSTAR 21 will remain unchanged as data is added to data set 24. DS1LSTAR 21 will point to the last record on the last allocated track of volume 100. It should be understood that while the space allocated for data set 24 on volume 100 is full, that does not mean that the entire volume 100 is full as there may be space allocated on volume 100 for other data sets. Data sets can reside on more than two volumes in a similar manner to that described in FIG. 2.

FIG. 2 also illustrates how a data set can be moved from multiple volumes to a single volume and visa versa. As used herein, data movement will include all types of data transfers including copying and moving data. Data set 24 is a multi-volume data set that resides on volumes 100 and 200. Assuming volume 300 is a larger volume capable of storing all of the data in data set 24, if data set 24 is copied or moved from volumes 100 and 200 to volume 300, the DS1LSTAR that tracks the last used track and record will change from being on the second volume (i.e., DS1LSTAR 22) to being on a single volume, as indicated by DS1LSTAR 23 on volume 300. Likewise, data set 24 could be moved or copied from volume 300 to volumes 100 and 200 to go from a single volume data set to a multi-volume data set. In that case, the DS1LSTAR that is updated as data is added to data set 14 will reside on the second volume (i.e., DS1LSTAR 22 on volume 200).

Figure 3:
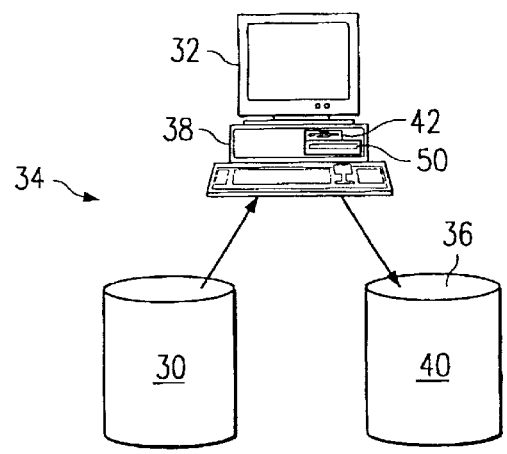
FIG. 3 shows the movement of a non-VSAM data set in a physical volume storage environment.

FIG. 3 illustrates a standard transfer of data in a physical data storage environment 34 from physical source volume 30 to physical target volume 40 through host computer 32 having a microprocessor 38, storage medium 42, and data movement program 50. In a standard data transfer, the data movement program 50 would acquire the necessary amount on space on target volume 40, and would read the data set from the source volume 30 into memory on a host 32 (or central processing unit) prior to writing the data in the data set out to target volume 40. In this standard data movement scheme from physical source to physical target, the data movement program 50 can track the control information, including the DS1LSTAR, for the data set as it is read from the host 32 onto the target volume 40. In this prior art method of tracking control information, as the data set is written into the host and onto the target volume, the last track and record location for each volume in the target volume set is simply recorded in that volume's VTOC 36 after the data movement has occurred.

Figure 4:
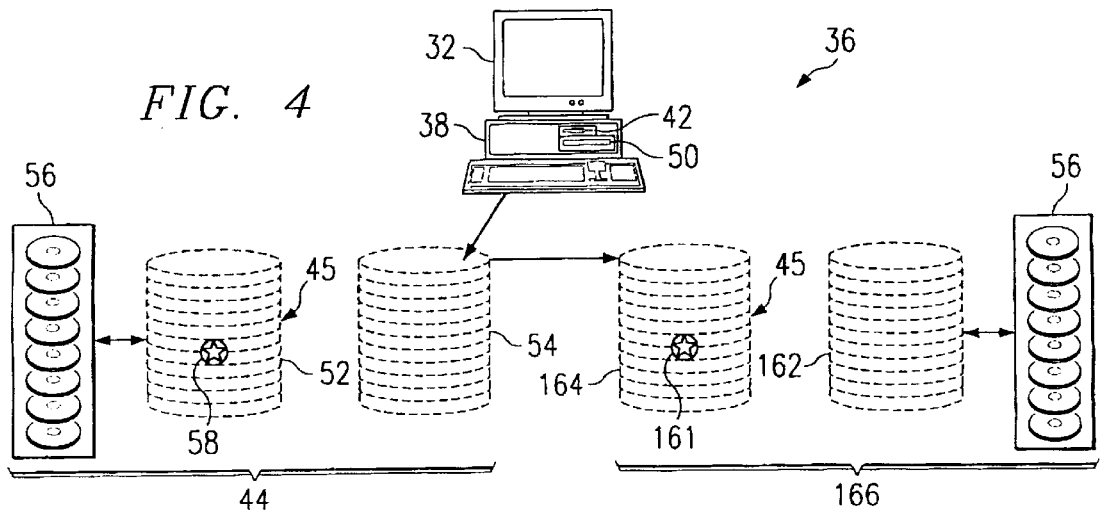
FIG. 4 shows the movement of a non-VSAM data set in a virtual volume storage environment.

However, with the development of SNAPSHOT, OUTBOARD, and other virtual volume data movement environments where the data is not read into a host during data movement, it becomes difficult to keep track of the control information such as the DS1LSTAR. Because the data is not read into a host from the source virtual volume and is not written from the host to the target virtual volume (s), the space used within each target virtual volume can't be determined from the writing of the data into each volume (because the writing step simply does not occur). FIG. 4 illustrates a virtual volume environment 36 that includes source storage subsystem 44 and target storage subsystem 166 where data movement between the two is facilitated by host computer 32 having a microprocessor 38, a storage medium 42, and data movement program 50. Data movement program 50 can comprise a number of programs including a backup program, a snapshot program, an extension determination program, and work space locator program. The source storage subsystem 44 includes virtual volumes 52 and 54 and source physical volume set 56, while target storage subsystem 166 includes target virtual volumes 164 and 162 and target physical volume set 56. The virtual volumes 52, 54, 162, and 164 in the storage subsystems appear to the host 32 just like traditional physical volumes with data set 45 and control information including DS1LSTAR 58 for data set 45. In reality, the data in data set 45 is actually stored within source subsystem 44 on source physical volume set 56. A correlation table tracks the physical location of the data set 45 on source physical volume set 56 with pointer values on the virtual volume 52.

With reference to FIG. 4, the data movement program 50 controls the execution of the data movement from source virtual volume 52 to target virtual volume 54. The data movement program 50 locates the virtual tracks on source virtual volume 52 that contain the source data set 45 which is to be moved and determines the number of tracks needed to store data set 45 and locates that number of tracks on virtual volume 164 within target subsystem 166. This blocks these tracks on target virtual volume 164 from being used. Data movement program 50 can suspend any further updates to data set 45 until the move has occurred. The data movement program 50 can now update the pointers for data set 45 in the virtual track table of target virtual volume 164 so the pointers for the allotted tracks now have the same value as the pointers from the virtual track table in source virtual volume 52. This can be done by copying the source virtual volume 52 pointers for data set 45 to target virtual volume 164. If data set 45 is copied to target virtual volume 164, then data movement program 50 records a correspondence between the virtual track location of data set 45 on source virtual volume 52 and the virtual track location of data set 45 on target virtual volume 164. The operation of a virtual volume data movement is described even more fully in and commonly assigned U.S. patent application Ser. No. 09/006,638, now U.S. Pat. No. 6,078,932 filed by Don R. Blea, Mark Haye, Ronald M. Kern, David M. Shackleford, and John G. Thompson, entitled "POINT IN TIME BACKUP UTILIZING MULTIPLE COPY TECHNOLOGIES", which application is hereby incorporated by reference. The tracking of the control information, particularly the DS1LSTAR 61 after such a data movement is the subject of the present invention.

The present invention provides a system and method for maintaining the control data information for the movement of non-VSAM data sets in either physical volume or virtual volume environments. For physical volume data set movement where the data set must be read into a host and written to the target physical volume(s), the present invention provides an alternative to prior art methods for maintaining non-VSAM data set control information, including the location for the DS1LSTAR. For virtual volume environments where the data set movement does not involve reading the data into a host, the present invention provides a solution to the problem of maintaining the control information and the location of the DS1LSTAR on the target volume(s).

Figure 5:
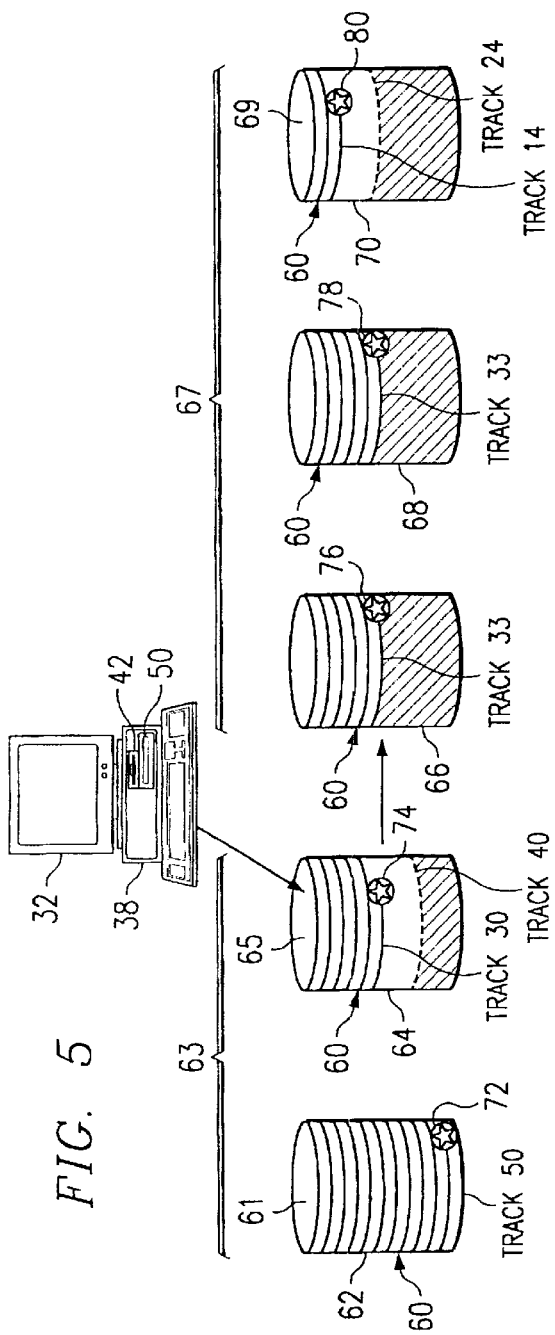
FIG. 5 shows the movement of a non-VSAM data set in a virtual volume storage environment while maintaining the control information according to an embodiment of the present invention.

FIG. 5 illustrates the movement of a multi-volume non-VSAM data set 60 within a virtual volume storage environment from source volumes 62 and 64 to target volumes 66, 68 and 70, while maintaining the data set 60 control information (including the DS1LSTAR), according to the present invention. The data movement is controlled by data movement program 50 stored on host computer 32. Note that for physical volume to physical volume transfer, this will be done by reading data set 60 into the host and writing data set 60 to target volume set 67. A virtual volume to virtual volume transfer will be accomplished without reading data set 60 into a host. In either case, the present invention can compute and provide the location of the target DS1LSTAR 80 of data set 60 once data set 60 has been moved to target volumes 66, 68 and 70.

Each source data set will have a certain number of tracks allocated within the source volumes and will have a certain number of tracks actually used within the source volumes. As shown in FIG. 5, data set 60 has been allocated ninety tracks which is divided as fifty tracks on source volume 62 and forty tracks on source volume 64. Data set 60 actually uses eighty tracks of space (shown as fifty tracks on source volume 72 and thirty tracks on source volume 64). In order to perform a movement of data set 60 without reading the data from data set 60 into a host, the first step requires allocating at least eighty tracks of space on target volume set 67. Optionally, ninety tracks or more could be allocated on target volume set 67.

Because target volumes 66 and 68 are partially full with other data sets (shown as the shaded portion of target volumes 66 and 68), data set 60 has been allotted thirty-three tracks in target volume 66, thirty-three tracks in target volume 68, and at least fourteen tracks allotted in target volume 70, for a total of eighty tracks of allocated space within target volume set 67. Alternatively, a full ninety tracks could be allocated on target volume set 67 so that target volume 70 would have twenty-four tracks allocated to data set 60.

When data set 60 is moved from source volumes 72 and 74 to target volumes 66, 68, and 70, data set 60 will use all thirty-three tracks allocated on target volume 66, all thirty-three tracks allocated on target volume 68, and fourteen of the twenty-four tracks allocated on target volume 70. The present invention will maintain the control information and an accurate DS1LSTAR of each target volume in target volume set 67 after the data set 60 has been moved.

As noted earlier, each DS1LSTAR is a relative track number and record indicator stored within the VTOC of each volume that indicates the number of tracks used to store the data set and the last record used on the last track. In FIG. 5, assume each track contains five records. For source volume 62, the DS1LSTAR 72 is "505". The "505" TTR value indicates that data set 60 had completely used all of the allotted fifty tracks on source volume 62 and that the last record used on the fiftieth track 50 was record "5" (i.e., the last record available). Similarly, the data set 60 DS1LSTAR 74 for source volume 64 will read "304" (where TT=30 and R=4). As indicated in FIG. 5, data set 60 uses thirty tracks on source volume 64 (for a TT value of "30"), but the last record used on the thirtieth allotted track for data set 60 is not the last record (not record "5"), but rather record "4".

In order to maintain accurate DS1LSTAR information after the data set 60 is moved from source volume set 63 to target volume set 67, the "TT" values for the valid DS1LSTARS of the source volumes are added together to determine the total number of tracks used by data set 60 in the source volume set 63. As shown above, DS1LSTAR 72 has a TTR of "505" that denotes the use of fifty tracks on source volume 72 and DS1LSTAR 74 has a TTR of "304" that denotes the use of thirty tracks on source volume 74, for a total tracks of eighty tracks used to store data set 60. The data movement program 50 can access VTOC 61 of source volume 62 to determine from the DS1LSTAR 72 (having TT="50") that fifty relative tracks had been used on source volume 62 to store data set 60. From VTOC 61 of volume 62, the data movement program 50 can also determine that source volume 62 was not the last source volume used to store data for data set 60. Data movement program 50 would then access VTOC 65 of source volume 64 to determine from DS1LSTAR 74 (having TT="30") that thirty relative tracks of source volume 64 had also been used to store data set 60. The VTOC 65 of volume 64 would also contain an indicator that volume 64 is the last volume containing data for data set 60. Data movement program 50 adds DS1LSTAR 72's TT value of "50" to DS1LSTAR 74's TT value of "30" to determine that a total of eighty tracks are required to store the data from data set 60. It should be understood that no matter how many tracks are included in source volume 72 and source volume 74 in total, in the example of FIG. 5, only eighty of those tracks are used in storing data set 60.

Once the total number of tracks used by the data set has been determined by the data movement program 50, the data set 60 is moved from source volumes 62 and 64 to target volumes 66, 68, and 70. If volumes 62, 64, 66, 68, and 70 are physical volumes, the movement requires reading the data into host 32 and writing the data to the target volumes 68 and 70. If volumes 62, 64, 66, 68, and 70 are virtual volumes, the movement of data set 60 is not read into host 32 to accomplish the data movement. The present invention will determine the new DS1LSTAR for the last byte of data in data set 60 (i.e., the last TTR of data) for either environment.

The data movement program 50 now analyzes the available space on each target volume to determine the new DS1LSTAR for each target volume in target set 67. Because data set 60 requires eighty tracks of space, the data movement program 50 determines that the allotted space of thirty-three tracks in target volume 66 is entirely used. Thus, the "TT" value for DL1LSTAR 76 for data set 60 on target volume 66 will be "33". Furthermore, because more than thirty-three tracks of data are in data set 60, the data set 60 will completely fill the space available in target volume 66 and the "R" or record value will be the last record on the thirty-third track, or record "5". Thus, the data movement program determines that the DS1LSTAR 76 value for data set 60 in target volume 66 is "335", which denotes that all thirty-three allocated tracks are used (TT=33) and that all five records in the last track are used (R=5). The data movement program 50 will place this TTR value in the VTOC of target volume 76. The data movement program 50 further calculates that since thirty-three tracks of data set 60 have been stored on target volume 66, there are eighty minus thirty-three, or forty-seven tracks of data set 60 remaining to be stored on target volumes 68 and 70.

This step is repeated similarly for each target volume. Because data set 60 requires forty-seven more tracks of space after filling the thirty-three tracks of target volume 66, the data movement program 50 calculates that the allotted space of thirty-three tracks in target volume 68 is also entirely used. Thus, the data movement program 50 determines that the DS1LSTAR 78 for data set 60 in target volume 68 is also "335" (TT=33 and R=5). The data movement program 50 will place this TTR value in the VTOC of target volume 78. The data movement program 50 adds the thirty-three tracks of data set 60 that have been stored on target volume 66 to the thirty-three tracks of data set 60 have been stored on target volume 68 to calculate that sixty-six tracks of data set 60 have been stored on target volumes 66 and 68. The data movement program 50 subtracts the sixty-six stored tracks from the eighty total tracks to determine that fourteen tracks of data set 60 remain to be stored on target volume 70.

From the earlier allocation of tracks in target volume 67, a the data movement program 50 allocated a minimum of eighty total tracks on target volume set 67 to receive data set 60. Assume data movement program 50 actually allocated ninety total tracks so that target volume 70 has twenty-four tracks allocated for data set 60, as shown in FIG. 5. Thus, the remaining fourteen tracks of data in data set 60 after target volumes 66 and 68 have been filled go into the twenty-four tracks allocated on target volume 70. Because data set 60 will end prior to filling the twenty-four allocated tracks, target volume 70 is the last volume that will hold data for data set 60. Thus, the data movement program can determine that the last DS1LSTAR for data set 60 will reside on target volume 70. This is true even if more space had been allocated on additional target volumes.

Because all fourteen tracks remaining tracks of data set 60 are stored on target volume 70, the data movement program 50 determines the TT value for the DS1LSTAR 80 will be "14". The record value for DS1LSTAR 80 will be the same record value for the DS1LSTAR 74 on source volume 64 because the record size for all of the source and target volumes in FIG. 5 is the same. In other words, since the target and source volumes have identical record geometry, the last track for the source volume will be identical in length to the last tract for the target volume after the data set is moved. Therefore, since the record value R was equal to "4" for DS1LSTAR 74, the record value for DL1LSTAR 80 will also be "4". Thus, the DS1LSTAR for data set 60 on target volume 70 will be "144". The data movement program 50 will access the VTOC 65 information to determine the record value for DS1LSTAR 74 on source volume 64 was "4" and will combine that with the TT value of "14" to give a TTR value of "144" for DS1LSTAR 80. Data movement program 50 will then place this DS1LSTAR 80 information of "144" for data set 60 in VTOC 69 of target volume 70.

It should be noted that virtual volume storage environments developed to date, such as SNAPSHOT, require the device geometry to be the same. Thus, the record size on each track of every volume in the storage environment must be the same. Thus, the present invention, as in FIG. 5 above, has been described for such environments having volumes with identical record sizes. In such an environment, the new DS1LSTAR for the last target volume is determined by subtracting the TT value (or number of tracks used) for each target volume from the total TT value required for the data set, and adding the record number from the last DS1LSTAR from the last source volume to the TT value for the last target volume. In this way the DS1LSTAR for the last target volume is determined.

However, the present invention could be applied to storage environments having different record sizes by adding a multiplication step to determine the total number of records used (instead of the total number of tracks used) and calculating the number of records used in each target volume. In the final target volume, the data movement program 50 would simply determine the number of records used, divide the number of records by the records per track and the whole number derived would be the track, track "TT" value and the remainder would be the record "R" value for the last target volume DS1LSTAR. VERSUS The present invention requires the record size on each track of the source volumes to equal the record size on the target volumes for either physical or virtual volume environments.

Figure 6:
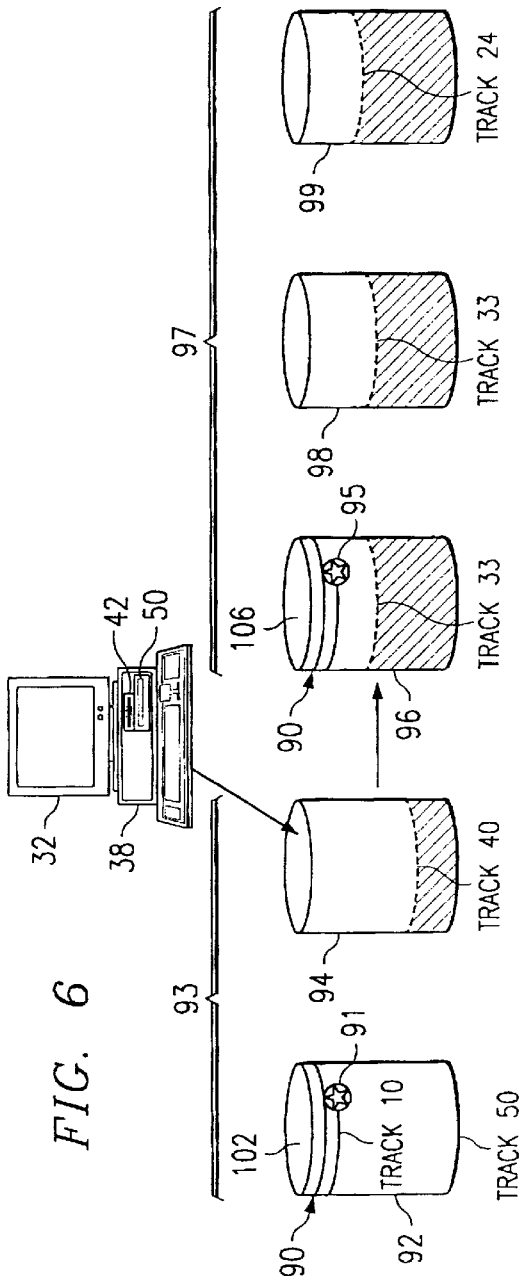
FIG. 6 shows the movement of another non-VSAM data set in a virtual volume storage environment while maintaining the control information according to an embodiment of the present invention.

FIG. 6 further illustrates the movement of a single volume non-VSAM data set 90 from the source volumes 92 and 94 to target volumes 96, 98 and 99 without reading data set 90 into a host computer 32. The description of how to determine the new DS1LSTAR control information is very similar to that described in FIG. 5. FIG. 6 is configured identically to FIG. 5, except that data set 90 only uses ten tracks of its allocated ninety tracks on source volume set 91, while data set 60 used eighty of its ninety allocated tracks. Likewise, data set 90 will only use ten of the thirty-three tracks allocated on target volume 96 after the transfer.

Initially, the data movement program 50 again determines that the total number of tracks used by data set 90 is ten by accessing the TT value of DS1LSTAR 91 on VTOC 102 of source volume 92. Since source volume 92 has fifty tracks allocated for data set 90 and the DS1LSTAR 91 TT value shows only ten tracks have been used, the data movement program 50 determines that data set 90 resides entirely on source volume 92. The DS1LSTAR 91 value for data set 90 is on source volume 92 is "104" because the data set 90 occupies ten tracks and the first four records on the tenth track (i.e., TT="10" and R="4").

The data movement program 50 then allocates at least ten tracks in target volume set 97 for data set 90. In our specific example shown in FIG. 6, the data movement program 50 allocates the same amount of space in target volume set 97 of ninety tracks of space as was allocated in source volume set 93 (thirty-three tracks on target volume 96, thirty-three tracks on target volume 98, and twenty-four tracks on target volume 99). Data set 90 is then moved from source volume set 93 to target volume set 97.

The data movement program 50 analyzes the available space on each target volume to determine the new DS1LSTAR for each target volume in target set 97. Because data set 90 requires only ten tracks of space, the data movement program 50 determines that the allotted space of thirty-three tracks in target volume 96 will hold all of data set 90. Thus, the DS1LSTAR 95 for data set 90 on target volume 96 will be the last DS1LSTAR for data set 90 after movement of data set 90 onto target volume set 97.

Since all ten tracks of data in data set 90 fit on target volume 96, target volume 96 is the last volume that will hold data for data set 90. This is true even if though more space had been allocated on additional target volumes 98 and 99. Because all ten tracks of data set 90 are stored on target volume 96, the data movement program 50 determines that the TT value for the DS1LSTAR 95 will be "10". The record value for DS1LSTAR 95 will be the same as the record value for the DS1LSTAR 91 on source volume 92 because the record size for all of the source and target volumes in FIG. 6 is the same. Since the record value R was equal to "4" for DS1LSTAR 91, the record value for DL1LSTAR 95 will also be "4". The data movement program 50 will access the VTOC 102 information on source volume 92 to determine the record for DS1LSTAR 91 was "4" and will combine that with the TT value of "10". Thus, data movement program 50 determines the DS1LSTAR 95 for data set 60 on target volume 70 will be "104". The data movement program 50 will place the DS1LSTAR 95 TTR value of "104" in the VTOC 106 for target volume 96.

As shown, the present invention provides a system and method for maintaining control information, including the DS1LSTAR, after the movement of non-VSAM data sets. It should be understood that the present invention is equally applicable to data moves from physical volume to physical volume or virtual volume to virtual volume.

Although the present invention has been described in detail, it should be understood that various changes, substitutions and alterations can be made hereto without departing from the spirit and scope of the invention as described by the appended claims.

What is claimed is:

1. A method for maintaining non-VSAM data set control information when moving a non-VSAM data set that is not read into a host from a source volume to a target volume, each volume having a volume table of contents (VTOC) containing the non-VSAM data set control information and a number of tracks, each track having an equal number of records, comprising:

determining a total number of tracks occupied by the data set on the source volume;

allocating in the at least one target volume at least the total number of tracks occupied by the data set on the source volume;

moving the data set from the at least one source volume to the target volume;

analyzing the target volume to determine the last track and record used by the data set; and recording the last track and record used by the data set in the target volume VTOC.

2. The method of claim 1, wherein each volume is a virtual volume.

3. The method of claim 1, wherein the data set is contained in a source volume set having at least one source volume and the data set is moved to a target volume set having at least one target volume.

4. The method of claim 3, wherein control information includes a DS1LSTAR for each volume, each DS1LSTAR being a three byte value in a TTR format where "TT" denotes a relative track position of the last track of data in the data set and "R" denotes the last record of data on the last track of data in the data set.

5. The method of claim 4, wherein determining the total number of tracks occupied by the data set on the at least one source volume further comprises:

obtaining from the VTOC for each source volume the TT value for the data set; and adding together each TT value obtained to determine the total number of tracks occupied by the data set on the at least one source volume.

6. The method of claim 5, wherein analyzing the target volume to determine the last track and record used by the data set further comprises:

(a) determining a number of tracks in the data set remaining to be stored;

(b) comparing the number of tracks in the data set remaining to be stored to a number of tracks allocated on a first target volume;

(c) if the number of tracks allocated on the first target volume is greater than the number of tracks remaining to be stored:

accessing the VTOC of a last source volume containing data for the data set to obtain the R value for the DS1LSTAR of the last source volume;

determining a TTR value for the data set on the first target volume having a TT value equal to the number of tracks in the data set remaining to be stored and an R value equal to the R value of the last source volume; and recording in the VTOC of the first target volume the TTR value for the DS1LSTAR of the first target volume; and (d) if the number of tracks allocated on the first target volume is less than the total number of tracks remaining to be stored:

determining a TTR value for the data set on the first target volume having a TT value equal to the total number of tracks allocated on the first target volume and an R value equal to a total number of records on each track; and recording in the VTOC of the first target volume the TTR value for the DS1LSTAR of the first target volume; and repeating steps (a)–(d).

7. The method of claim 6, wherein determining a number of tracks in the data set remaining to be stored further comprises subtracting form the total number of tracks occupied by the data set a number of tracks previously stored in the at least one target volume.

8. A method for maintaining non-VSAM data set control information when moving a data set from a source volume set having at least one source volume to a target volume set having at least one target volume, each volume having a volume table of contents (VTOC) containing the non-VSAM data set control information and a number of tracks, each track having a number of records, comprising:

determining a total number of tracks occupied by the data set on the at least one source volume;

allocating in the at least one target volume at least the total number of tracks occupied by the data set on the at least one source volume;

moving the data set from the at least one source volume to the at least one target volume;

analyzing the at least one target volume to determine the last track and record used by the data set; and recording the last track and record used by the data set for each target volume in a corresponding target volume VTOC.

9. The method of claim 8, wherein each volume is a physical volume.

10. The method of claim 8, wherein control information includes a DS1LSTAR for each volume, each DS1LSTAR being a TTR value having three bytes in a TTR format where "TT" denotes a relative track position of the last track of data in the data set and "R" denotes the last record of data on the last track of data in the data set.

11. The method of claim 10, wherein determining the total number of tracks occupied by the data set on the at least one source volume further comprises:
   obtaining from the VTOC for each source volume the TT value for the data set; and
   adding together each TT value obtained to determine the total number of tracks occupied by the data set on the at least one source volume.

12. The method of claim 10, wherein analyzing the target volume to determine the last track and record used by the data set further comprises:
   (a) determining a number of tracks in the data set remaining to be stored;
   (b) comparing the number of tracks in the data set remaining to be stored to a number of tracks allocated on a first target volume;
   (c) if the number of tracks allocated on the first target volume is greater than the number of tracks remaining to be stored:
      accessing the VTOC of a last source volume containing data for the data set to obtain the R value for the DS1LSTAR of the last source volume;
      determining a TTR value for the data set on the first target volume having a TT value equal to the number of tracks in the data set remaining to be stored and an R value equal to the R value of the last source volume; and
      recording in the VTOC of the first target volume the TTR value for the DS1LSTAR of the first target volume; and
   (d) if the number of tracks allocated on the first target volume is less than the total number of tracks remaining to be stored:
      determining a TTR value for the data set on the first target volume having a TT value equal to the total number of tracks allocated on the first target volume and an R value equal to a total number of records on each track; and
      recording in the VTOC of the first target volume the TTR value for the DS1LSTAR of the first target volume; and
      repeating steps (a)–(d).

13. The method of claim 12, wherein the source volume set and the target volume set contain physical volumes an the data movement is accomplished by reading the data into a host.

14. A method for maintaining non-VSAM data set control information when moving a non-VSAM data set that is not read into a host from a source volume set containing at least one source volume to a target volume set containing at least one target volume, each volume having a volume table of contents (VTOC) containing the non-VSAM data set control information and a number of tracks, each track having a number of records, comprising:
   determining the total number of records used by the data set;
   allocating at least the total number of records used by the data set in the target volume set;
   moving the data set from the source volume set to the target volume set;
   determining the last track and record used on each target volume of the target volume set, comprising:
      (a) comparing the number of records used in the data set to the number of records allocated in the first target volume;
      (b) determining the number of tracks used on the first target volume and the number of records used on the last track by dividing the number of records used in the data set by the number of records that can be stored on each track;
      (c) if the number of records allocated in the first target volume is less than (i) the number of records used in the data set for the first target volume or (ii) the number of records remaining to be stored for subsequent target volumes:
         determining the number of records of the data set remaining to be stored;
         comparing the number of records remaining to be stored to the number of tracks allocated on a subsequent target volume; and
         determining the number of tracks used on the subsequent target volume and the number of records used on the last track of the subsequent target volume by dividing the number of records used in the data set by the number of records that can be stored on each track; and
      repeating steps (b) and (c) as necessary for subsequent target volumes.

15. The method of claim 14, wherein determining the number of tracks used on each target volume further comprises taking a result of dividing the number of records used in the data set by the number of records that can be stored on each track and rounding up to the next whole number, and further wherein determining the number of records used on the last track further comprises calculating the remainder resulting from dividing the number of records used in the data set by the number of records that can be stored on each track.

16. The method of claim 15, further comprising:
   converting the number of tracks used on each target volume to a two byte TT value;
   converting the number of records used on the last track of each target volume to a one byte R value;
   combining the TT value and the R value to obtain a TTR value for each target volume; and
   recording the TTR value for each target volume in a corresponding target volume VTOC.

17. A system for maintaining a non-VSAM data set control information when moving a data set from a source volume to a target volume, comprising:
   a host computer, comprising a processor and a memory; and
   a data movement program residing on the memory operable to direct the host computer to:
      determine a total number of tracks occupied by the data set on the source volume;
      allocate in the at least one target volume at least the total number of tracks occupied by the data set on the source volume;
      move the data set from the at least one source volume to the target volume;
      analyze the target volume to determine the last track and record used by the data set; and record the last track and record used by the data set in a VTOC of a last target volume to hold data for the data set.

18. The system of claim 17, wherein each volume is a virtual volume.

19. The system of claim 17, wherein control information includes a DS1LSTAR for each volume, each DS1LSTAR being a three byte value in a TTR format where "TT" denotes a relative track position of the last track of data in the data set and "R" denotes the last record of data on the last track of data in the data set.

20. The system of claim 19, wherein the data movement program, while directing the host computer to determine the total number of tracks occupied by the data set on the at least one source volume, further directs the host computer to:

obtain from the VTOC for each source volume the TT value for the data set; and add together each TT value obtained to determine the total number of tracks occupied by the data set on the at least one source volume.

21. The system of claim 20, wherein the data movement program, while analyzing the target volume to determine the last track and record used by the data set, further directs the host computer to:

(a) determine a number of tracks in the data set remaining to be stored;

(b) compare the number of tracks in the data set remaining to be stored to a number of tracks allocated on a first target volume;

(c) if the number of tracks allocated on the first target volume is greater than the number of tracks remaining to be stored:

access the VTOC of a last source volume containing data for the data set to obtain the R value for the DS1LSTAR of the last source volume;

determine a TTR value for the data set on the first target volume having a TT value equal to the number of tracks in the data set remaining to be stored and an R value equal to the R value of the last source volume; and record in the VTOC of the first target volume the TTR value for the DS1LSTAR of the first target volume; and (d) if the number of tracks allocated on the first target volume is less than the total number of tracks remaining to be stored:

determine a TTR value for the data set on the first target volume having a TT value equal to the total number of tracks allocated on the first target volume and an R value equal to a total number of records on each track; and record in the VTOC of the first target volume the TTR value for the DS1LSTAR of the first target volume; and repeat steps (a)–(d).

\* \* \* \* \*

UNITED STATES PATENT AND TRADEMARK OFFICE
CERTIFICATE OF CORRECTION

PATENT NO. : 6,189,015 B1
DATED : February 13, 2001
INVENTOR(S) : Reed et al.

It is certified that error appears in the above-identified patent and that said Letters Patent is hereby corrected as shown below:

<u>Title page,</u>
Item [57], ABSTRACT,
Line 7, change "is recorded the in each" to -- is recorded in each --

<u>Column 7,</u>
Line 38, delete "a" in the first instance
Line 52, delete "tracks" in the first instance <u>Column 10,</u>
Line 48, change "form" to -- from --

<u>Column 11,</u>
Line 55, change "an" to -- and --

Signed and Sealed this

Sixteenth Day of July, 2002

*Attest:*

JAMES E. ROGAN
*Director of the United States Patent and Trademark Office*

*Attesting Officer*